(12) United States Patent
Oldham et al.

(10) Patent No.: US 10,689,134 B2
(45) Date of Patent: Jun. 23, 2020

(54) DEVICE FOR CONTROLLED SEPARATION BETWEEN TWO PARTS AND USE OF SUCH A DEVICE

(71) Applicant: AIRBUS DEFENCE AND SPACE SAS, Les Mureaux (FR)

(72) Inventors: Robert Oldham, Toulouse (FR); Philippe Mayo, Toulouse (FR); Franck Levallois, Toulouse (FR); Christophe Figus, Toulouse (FR); Daniel Logut, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 40 days.

(21) Appl. No.: 15/764,645

(22) PCT Filed: Sep. 19, 2016

(86) PCT No.: PCT/FR2016/052369
§ 371 (c)(1),
(2) Date: Mar. 29, 2018

(87) PCT Pub. No.: WO2017/055706
PCT Pub. Date: Apr. 6, 2017

(65) Prior Publication Data
US 2018/0273216 A1    Sep. 27, 2018

(30) Foreign Application Priority Data

Sep. 30, 2015 (FR) ...................................... 15 59241

(51) Int. Cl.
*B64G 1/64* (2006.01)
*F42B 15/36* (2006.01)
(Continued)

(52) U.S. Cl.
CPC ............. *B64G 1/645* (2013.01); *B64G 1/002* (2013.01); *B64G 1/222* (2013.01); *F42B 15/36* (2013.01)

(58) Field of Classification Search
CPC ........ B64G 1/645; B64G 1/002; B64G 1/222; F42B 15/36
See application file for complete search history.

(56) References Cited

U.S. PATENT DOCUMENTS

| 6,299,105 B1 | 10/2001 | Gilmore |
| 2011/0089590 A1* | 4/2011 | DeCusatis ............... B29C 33/44 264/2.7 |

(Continued)

FOREIGN PATENT DOCUMENTS

| FR | 2947808 A1 | 1/2011 |
| FR | 3009282 A1 | 2/2015 |

(Continued)

OTHER PUBLICATIONS

Japanese Office Action for Application No. 2018-515943, dated Aug. 21, 2018, with English translation provided.

(Continued)

*Primary Examiner* — Rodney A Bonnette
(74) *Attorney, Agent, or Firm* — Young & Thompson (57) ABSTRACT

Disclosed is a device for controlled separation of a first so-called stationary part and a second so-called mobile part, the stationary part having a stationary connecting surface opposite a mobile connecting surface of the mobile part, the stationary part having a different thermal expansion coefficient from that of the mobile part, the separation device including: at least one connecting agent arranged in a layer between the stationary connecting surface and the mobile connecting surface, at least one device for heating at least (Continued)

one of the stationary part and the mobile part, and at least one system for controlling the heating device.

29 Claims, 5 Drawing Sheets

(51) Int. Cl.
*B64G 1/22* (2006.01)
*B64G 1/00* (2006.01)

(56) References Cited

U.S. PATENT DOCUMENTS

| | | | |
|---|---|---|---|
| 2012/0110823 A1 | 5/2012 | Behar | |
| 2014/0054599 A1* | 2/2014 | Choi | H01L 31/03044 257/76 |
| 2014/0163664 A1* | 6/2014 | Goldsmith | A61B 17/00491 623/1.11 |
| 2015/0266594 A1* | 9/2015 | Hu | B64G 1/34 244/167 |
| 2016/0169646 A1 | 6/2016 | Comtesse et al. | |
| 2016/0169647 A1 | 6/2016 | Medina et al. | |
| 2016/0195378 A1 | 7/2016 | Medina et al. | |

FOREIGN PATENT DOCUMENTS

| | | |
|---|---|---|
| FR | 3009283 A1 | 2/2015 |
| FR | 3009284 A1 | 2/2015 |
| JP | 2004-089791 | 3/2004 |
| JP | 2009/166678 A | 7/2009 |
| JP | 2011-122229 | 6/2011 |
| WO | 2015/014942 A1 | 2/2015 |

OTHER PUBLICATIONS

International Search Report, dated Dec. 12, 2016 from corresponding PCT application No. PCT/FR2016/052369.

* cited by examiner

DEVICE FOR CONTROLLED SEPARATION BETWEEN TWO PARTS AND USE OF SUCH A DEVICE

The invention relates to a device for the separation of two parts, for use particularly, but not exclusively, in the field of space vehicles. In particular, this invention relates to satellites comprising appendages or equipment such as solar panels or radiators, intended to be deployed from a stowed position, for the launch for example, to an operational or released position when the satellite is in orbit, i.e. from a stationary state to a free state. The invention also relates to moving items of equipment of a satellite, i.e. items of equipment intended to be moving when the satellite is in orbit, and which must be secured for example during the launch.

According to a particular embodiment, the invention proposes a destacking and/or release system of an appendage or item of equipment of a satellite, which does not contain any mechanism, is reliable, is not bulky, does not cause significant shocks and is inexpensive to manufacture.

Destacking and/or release systems already exist, using for example pyrotechnic systems, i.e. involving combustion for the purpose of destruction of a connecting part, or complex mechanical systems, or also systems based on separation by heating the parts to be separated.

Pyrotechnic systems cause numerous problems. In particular, during combustion, shocks and vibrations can be produced, risking damage to the items of equipment of the satellite, in particular the items of precision measuring equipment. Moreover, pyrotechnic systems generally result in debris which will be jettisoned into space, which is undesirable, particularly in the case where sensitive instruments, for example optical instruments or those for a telecommunications payload, are mounted on the satellite and risk being damaged or contaminated by the debris. Finally, pyrotechnic systems involve installing expensive wiring.

Document U.S. Pat. No. 6,299,105 gives an example of a separation device for destacking a deployable structure of a satellite. The deployable structure is mounted on a panel made from a composite material via a metal base. Once decoupled, the satellite is subjected by its environment to several thermal cycles, involving a succession of temperature increases and decreases. The metal base is designed to break by fatigue after a predetermined number of thermal cycles under the effect of deformations.

This solution has several drawbacks. In particular, the fatigue of the metal base is not controlled, but is dependent on the environmental conditions of the satellite. Consequently, the time of separation of the deployable structure cannot be accurately determined. Moreover, the reliability of the elements of the device must be high, in order to ensure that the separation does not take place at an inopportune time, which increases the costs of manufacture of the device. In this solution, the satellite must be placed in Low Earth Orbit (LEO) so that the thermal cycles of the environment are sufficient to obtain the separation within a few hours. This solution is unsuitable in the case of a geostationary or geosynchronous equatorial orbit (GEO), as the temperature differences are such that the separation would take several days to complete.

Document JP 2009-166678 proposes another solution, in which a screw provides the connection between two elements. The screw is inserted into threaded coaxial holes in order to hold the two elements fixed together. Heating means increase the temperature of one of the elements, so that the threads of the hole of the element in question expand. The screw is then no longer held on the heated element, allowing the two elements to separate.

The major drawback is that once freed from the heated element, the screw can become stuck in the hole of this element. Additional means must therefore be provided in order to ensure that the screw reliably leaves the hole in the heated element. Moreover, the screw is an additional part that has no further function once the separation of the two elements has taken place, unnecessarily increasing the weight and expense.

Finally, document FR 2947808 proposes a separation device based on the abrupt heating of one of the two connected elements. The two elements are connected by pins or by bonding. A first element is heated by a chemical heat source, in this case a Thermite, but not the second element, which is thermally isolated from the source. Under the effect of the abrupt increase in the temperature of a face of the first element, of the order of 300° C. in 1.4 s, the latter deforms in such a way as to move away from the second element, causing separation.

A drawback of this solution is that once the process of increasing the temperature is initiated, it is no longer possible to stop it in case of need, preventing emergency stops, for example when the process has been initiated unintentionally. Moreover, this solution requires control of the temperature increase on a single face of the heating element, without which the deformation is not sufficient to obtain separation. This is why the temperature increase must be abrupt—of the order of several seconds only—so that there is no transfer of heat to the other face of the heated element. The choice of the material for the heated element is therefore restricted, as it must also limit the thermal conduction therein. Moreover, such an abrupt increase risks damaging the items of equipment situated around the separation device, unless bulky and expensive insulation means are installed.

WO 2015/014942 discloses a separation device comprising a bonding agent, a heater and a control system.

Thus, there is a need for a new, two-part separation device that is particularly suitable for the space field, in particular overcoming the aforementioned drawbacks.

The invention therefore proposes a separation device in which the separation is controlled and predictable, reliable, does not increase costs, does not damage the surrounding items of equipment, does not produce any debris, and has a compact size, that does not increase the bulk.

According to a first aspect, the invention proposes a controlled separation device with a first so-called stationary part and a second so-called mobile part. The stationary part has a stationary connecting surface opposite a mobile connecting surface of the mobile part. Moreover, the stationary part has a thermal expansion coefficient different from that of the mobile part. The separation device thus comprises:
  at least one bonding agent placed in a layer between the stationary connecting surface and the mobile connecting surface,
  at least one device for heating at least one of the stationary part and the mobile part,
  at least one control system of the heating device.

The separation is thus based on the difference in the deformation between the stationary part and the mobile part during utilization of the heating device. The separation device then makes it possible to obtain the separation of the stationary part and the mobile part in a controlled manner, independently of the environment, and without implementing a deformation cycle.

The heating device can be mounted on the stationary part, without contact with the mobile part, so that the mobile part is not heated directly. The temperature difference combined with the difference in the thermal coefficient increases the difference in deformation between the stationary part and the mobile part, further promoting separation.

Preferably, the bonding agent has a glass transition temperature less than the heating temperature of the heating device, so that the bonding agent layer softens, weakening its mechanical strength. Furthermore, the bonding agent can have a decomposition temperature greater than the heating temperature of the heating device, so as not to be totally destroyed by the heating.

For example, the heating device comprises electrical heating elements, which are cheap, easy to install and to control. The electrical-type heating elements are for example wires that can easily be wound around the stationary part and/or the mobile part.

The bonding agent is for example an adhesive of the Hysol® EA9321 type.

According to an embodiment, the thermal expansion coefficient of the stationary part is greater than the thermal expansion coefficient of the mobile part. Thus, by placing the heating device on the stationary part, the latter is deformed more than the mobile part, in order to promote separation.

The stationary part can be produced from aluminium or one of its alloys, and the mobile part can be produced by selecting one of the following materials: Invar, titanium, silicon carbide, carbon fibre-reinforced polymer (CFRP). When the stationary part is produced from aluminium and the mobile part is produced from Invar, the difference between the thermal coefficient of the stationary part and the thermal expansion coefficient of the mobile part (8) is of the order of $20.10^{-6}$ ° $C.^{-1}$.

For example, the separation of the stationary part and the mobile part takes place in a period between 2 and 10 minutes. Also for example, the maximum temperature of the heating device is 200° C.

According to an embodiment, the control system comprises a wireless communication system for receiving a control signal, making it possible to start the heating device remotely, for example from Earth.

The part and the mobile part can have a cylindrical shape, such that the increase in temperature under the effect of the heating device takes place substantially uniformly within the parts by radiation.

The stationary part and the mobile part can be in direct contact or not.

According to a second aspect, the invention proposes the use of a separation device such as presented above by space launchers, space probes, satellites, missiles.

Other advantages of the invention will become apparent in the light of the following description of a particular embodiment, accompanied by the figures, in which.

Figure 1:
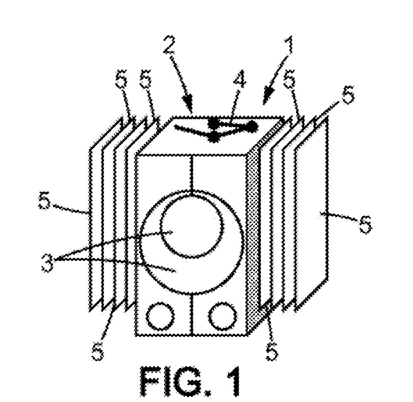
FIG. 1 is a diagrammatic perspective representation of a satellite comprising a main body on which a set of items of equipment is mounted, the items of equipment being in a stowed position.
Figure 2:
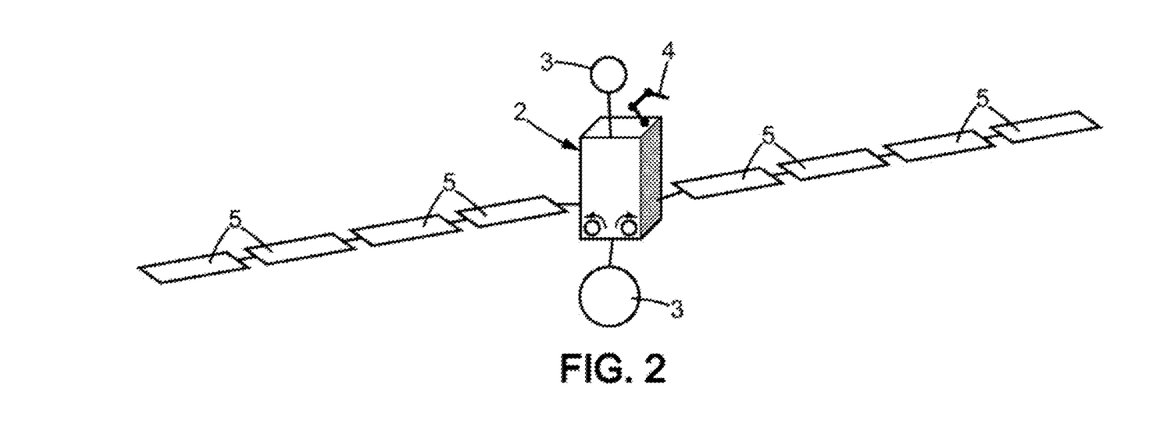
FIG. 2 is a representation of the satellite in FIG. 1 in which the items of equipment are in a deployed position.
Figure 3:
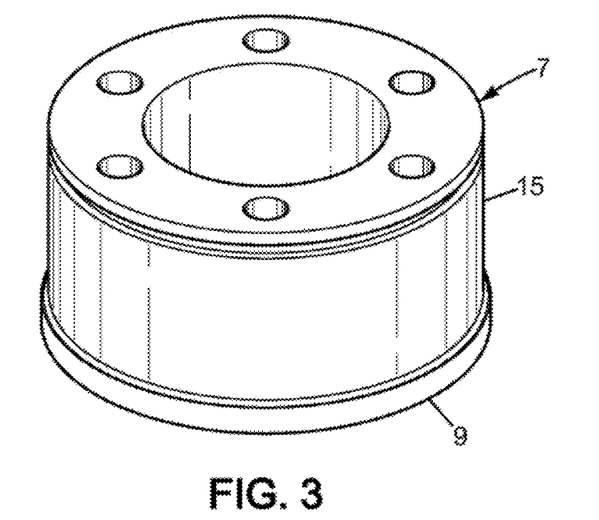
FIG. 3 is a three-dimensional representation of a first part of a separation device according to a first embodiment.
Figure 4:
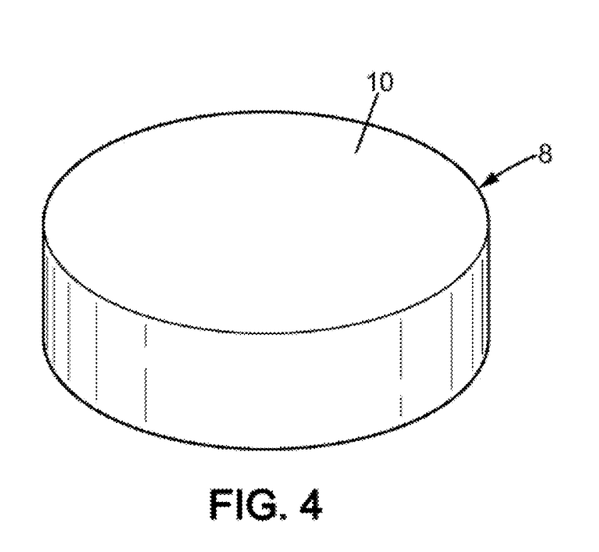
FIG. 4 is a three-dimensional representation of a second part of the separation device of the first embodiment.
Figure 5:
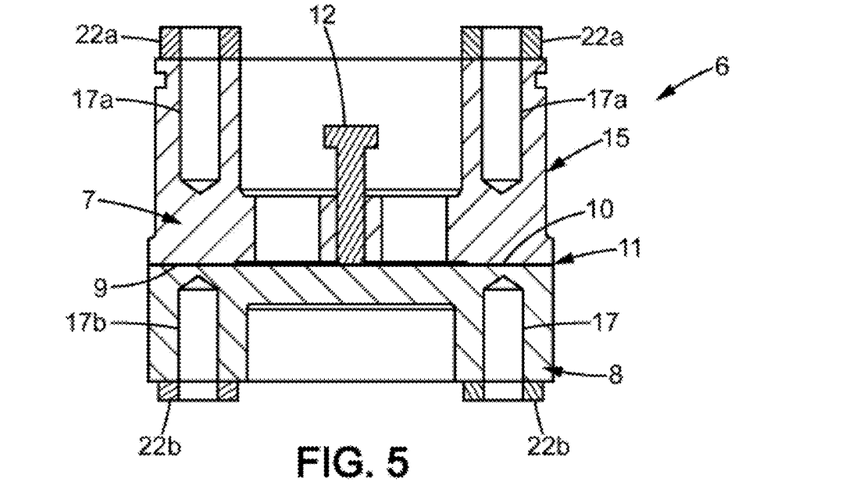
FIG. 5 is a cross section view of the separation device comprising the first part in FIG. 3 and the second part in FIG. 4.
Figure 6:
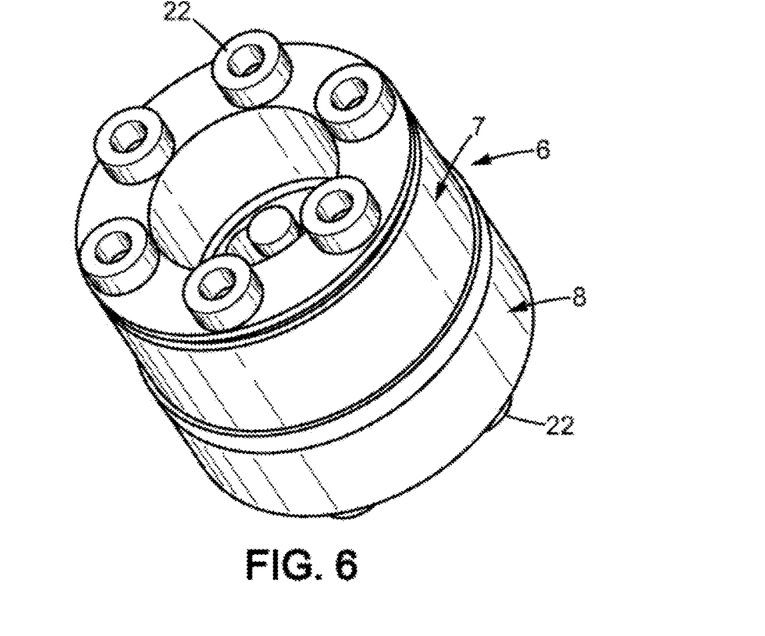
FIG. 6 is a perspective view of the device in FIG. 5.
Figure 7:
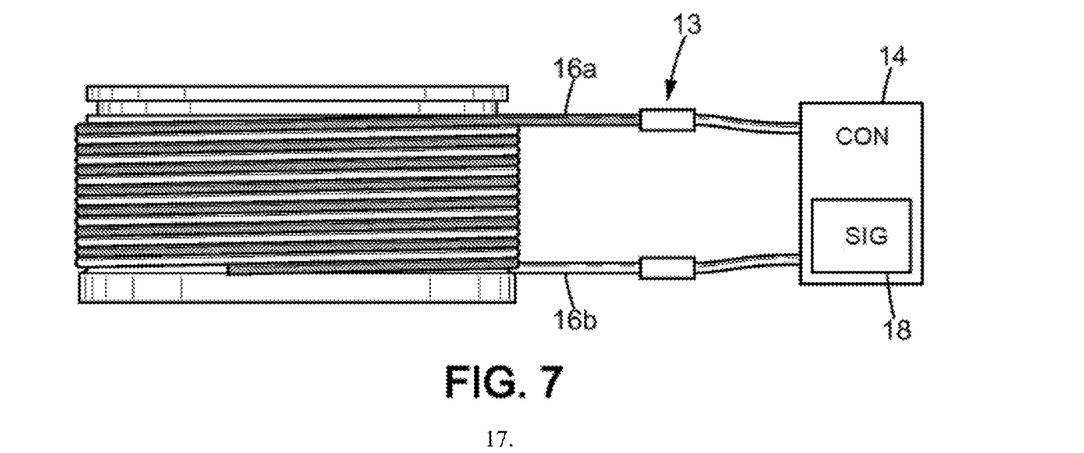
FIG. 7 is a diagrammatic representation of a device for heating the separation device.
Figure 8:
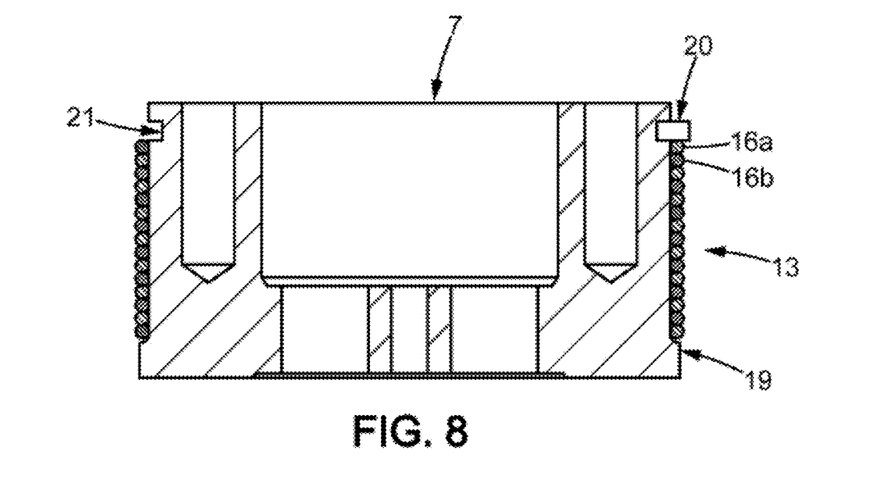
FIG. 8 is an illustration of the heating device in FIG. 7 mounted on the first part in FIG. 3.

FIGS. 1 and 2 show a space vehicle, in this case a satellite 1, comprising a main body 2 on which a set of items of equipment is mounted, at least one item of equipment of which is mobile with respect to the main body 2.

The mobile items of equipment comprise for example antennas 3, an arm 4 and solar panels 5, each of these items of equipment being deployable, i.e. they are mobile with respect to the main body 2 between a folded position (FIG. 1) in which they are stowed against the body 2 of the satellite in order to provide a compact form, suitable for the launch of the satellite 1, and a deployed position (FIG. 2), in which they are moved away from the body 2 for their use once the satellite is released in space.

It should be noted in the remainder of the description that the solar panels 5 are mounted in arrays, two arrays being formed on the body 2 of the satellite 1, on two opposite faces, an articulation being formed between two successive adjacent panels 5. When the solar panels 5 are in folded position, each panel 5 of an array is stowed against another panel 5 of the same array, in the manner of an accordion fold.

For each of the deployable items of equipment, the satellite 1 therefore needs one or more of the controlled separation devices 6 to be utilized, making it possible on the one hand to hold the deployable items of equipment in a folded position and the mechanisms and on the other hand to allow them to move into the deployed position.

The mobile items of equipment can also comprise a moving item of equipment, intended to adopt an inactive state, in which the item of equipment is immobile with respect to the main body 2, for example during the launch of the satellite, and an operational state in which the item of equipment is mobile with respect to the main body 2, for example when the satellite is in orbit. Again, one or more separation devices 6 between such a mechanism and the main body 2 are required, making it possible to hold the moving item of equipment in the inactive state and to release it in order to place it in the operational state.

The separation device 6 comprises a first so-called stationary part 7, and a second so-called mobile part 8, each rigidly fixed to a structure of the satellite 1, at an articulation. The stationary part 7 can for example be rigidly fixed to the body 2 of the satellite, in which case the mobile part 8 is rigidly fixed to a deployable item of equipment. In a variant, the stationary part 7 can be rigidly fixed to a solar panel 5 and the mobile part 8 is then rigidly fixed to the adjacent solar panel 5 of the same array. Any type of means can be used for mounting the stationary part 7 and the mobile part 8 on the body 2 or on one of the deployable items of equipment.

The stationary part 7 and the mobile part 8 are assembled via a high-strength bonding agent compatible with space requirements. In particular, the bonding agent has physical properties on which the environment of the satellite 1 has little or no impact, both during the launch and once in space.

More specifically, the stationary part 7 has a stationary connecting surface 9 intended to cooperate with a mobile connecting surface 10 of the mobile part 8. The stationary connecting surface 9 is opposite the mobile connecting surface 10, a layer 11 of the bonding agent being placed between the two connecting surfaces 9, 10. The stationary connecting surface 9 is compatible with the mobile connecting surface 10, i.e. their shape and their dimensions make it possible to place the two surfaces 9, 10 in contact with one another via the layer 11 of the bonding agent.

Thus, according to an example, the two connecting surfaces 9, 10 are flat, as shown in FIGS. 3 to 8. According to this example, the two parts 7, 8 are not in direct contact with one another, i.e. there is no direct contact surface between the stationary part 7 and the mobile part 8, without interposition of the layer 11 of bonding agent. This configuration makes it possible in particular to optimize the mechanical strength of the two parts 7, 8 together.

Figure 9:
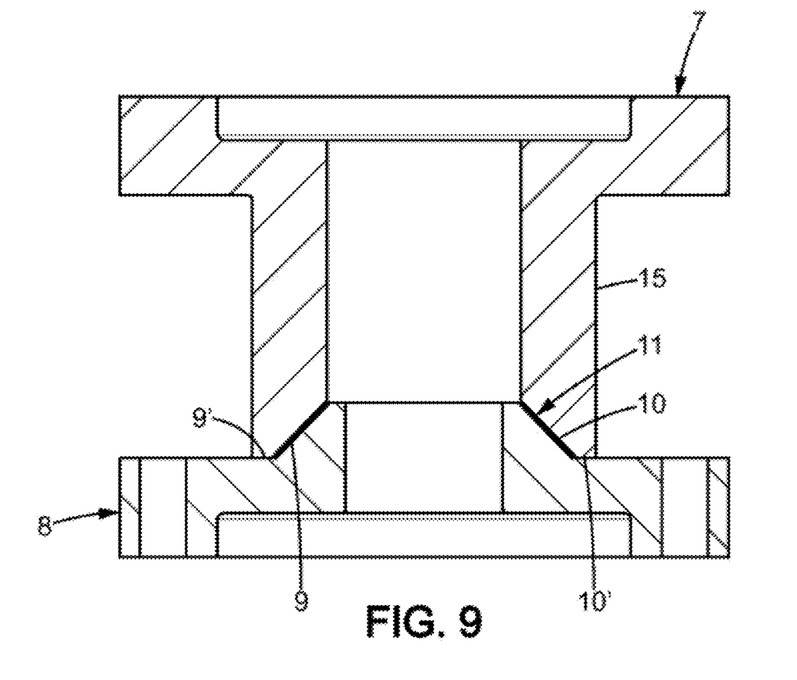
FIG. 9 is a view similar to FIG. 5, for a second embodiment of the separation device.

According to another embodiment shown in FIG. 9, the stationary part 7 is a so-called male part, and the mobile part 8 is a so-called female part. The connecting surfaces 9, 10 have a complementary tapered shape, the layer 11 of bonding agent being interposed between them. The angle at the apex of the tapered shape is for example of approximately 45°. Furthermore, in this configuration, the two connecting parts 7, 8 can be in direct contact. For example, the stationary part 7 comprises a contact surface 9' and the mobile part 8 comprises a contact surface 10'. The contact surfaces 9',10' have a shape that is compatible with direct contact with one another, without interposition of the layer 11 of bonding agent. For example, the two contact surfaces 9',10' are substantially flat. As will be explained hereinafter, this configuration makes it possible to contribute to the separation of the two parts 7, 8.

Preferentially, a specific surface preparation of the connecting surfaces 9, 10 of each of the parts 7, 8 is applied in order to adapt, i.e. to increase or reduce, the adhesion capacity of the bonding agent and make it possible to utilize several types of bonding agent. For example, each of the connecting surfaces 9, 10 can undergo abrasion, in order to vary the mechanical bonding properties with the bonding agent.

The stationary part 7 has a thermal expansion coefficient different from that of the mobile part 8. For example, the stationary part 7 is produced from a material with a very high thermal expansion coefficient, of the aluminium type, while the mobile part 8 is produced from a material with a very low thermal expansion coefficient, such as Invar, titanium (Ti), silicon carbide (SiC) or carbon fibre reinforced polymer (CFRP). Provision can however be made for the mobile part 8 to have a thermal expansion coefficient greater than that of the stationary part 7. One objective is to maximize the difference in the expansion coefficient by using materials that have a very high expansion coefficient in order to enable supply of the smallest possible amount of power to allow the separation. Preferably therefore, the difference in the thermal expansion coefficient between the material of the stationary part 7 and the material of the mobile part 8 is adapted in order to create a thermoelastic stress in the bonded assembly at least equal to the breaking strain of this assembly.

Optionally, the separation device 6 also comprises one or more preload elements 12 with shape memory or springs rigidly fixed to the stationary part 7 and which, as will be seen below, assist the separation of the two parts 7, 8.

The separation device 6 also comprises a device 13 for heating at least one of the stationary part 7 and the mobile part 8, and a control system 14 (CON) of the heating device 13. Preferably, the heating device 13 comprises electric heating elements, for example of the resistance type, and the control system 14 is of an electronic type, wired connecting means being placed between them. In order to facilitate their connection, according to the example presented here, the heating device 13 is mounted on the stationary part 7 and the control system 14 is mounted on the body 2 of the satellite.

According to the embodiment presented here, the outer surface of the stationary part 7 has at least one cylindrical portion 15 and the heating device 13 comprises at least one coil 16 of heating wires spirally wound around the cylindrical portion 15 of the stationary part 7. In order to ensure redundancy of the heating, two independent heating wire coils 16a, 16b can be used, wound alternately around the cylindrical portion 15 of the stationary part 7.

The spiral form is due to the fact in particular that a certain length of wire is necessary in order to obtain the desired temperatures with the available power. The spiral thus makes it possible to arrange the necessary length within a reduced space.

In order to ensure that the spirals remain in place during the mechanical loads of the launch, the two coils 16a, 16b are housed in a space constricted on one side by a shoulder 19 and on the other side by a retaining ring 20 located in a groove 21, the shoulder 19 and groove 21 being formed on the cylindrical portion 15 of the outer surface of the stationary part 7. The thermal contact between the spirals 16 and the cylinder 15 can be ensured by a bonding agent that optimizes conduction.

Alternatively, the coil or coils 16a, 16b utilized can be placed inside the stationary part 7, in a groove opened on the part attached to the satellite and cut into the cylindrical part 15 of the stationary part 7. Thus, the heating is even more efficient, as it takes place right at the heart of the stationary part 7 to be heated.

Preferably, the stationary part 7 and the mobile part 8 have rotational symmetry, at least with respect to their connecting surface 9, 10, so that the heat diffusion from the heating device 13 wound onto the cylindrical portion 15 of the stationary part 7 radiates uniformly into the parts, and in particular onto the connecting surfaces 9, 10, being circular or annular, limiting the risk of presence of a cold spot.

The separation device 6 is firstly pre-assembled, placing the stationary connecting surface 9 of the stationary part 7 in cooperation with the mobile connecting surface 10 of the mobile part 8, via the layer 11 of the bonding agent. For example, the layer 11 of bonding agent can be applied onto one of the stationary connecting surface 9 and the mobile connecting surface 10, and the other one of the stationary connecting surface 9 and the mobile connecting surface 10 is pressed onto the layer 11 of the bonding agent. The two parts 7, 8 are pressed against one another in order to obtain the adhesion of the bonding agent on the two connecting surfaces 9, 10. In a variant, a first layer of the bonding agent can be applied onto the stationary connecting surface 9 and a second layer can be applied onto the mobile connecting surface 10, then the two surfaces 9, 10 are brought together, the first layer being placed in contact with the second layer of the bonding agent, in order to form the layer 11 of bonding agent between the two parts 7, 8. Preferably, the layer 11 of the bonding agent is in contact on the stationary connecting surface 9 over a dimension equal to that with which it is in contact with the mobile connecting surface 10.

The pre-assembled separation device 6 is then installed on the satellite 1. For example, the stationary part 7 is rigidly fixed to the body 2 of the satellite by screwing into threaded holes 17a and the mobile part 8 is rigidly fixed to a deployable item of equipment of the satellite, also by screwing into threaded holes 17b. Insulating washers, respectively 22a and 22b, can be interposed, respectively on the one hand between the body 2 of the satellite and the stationary part 7, and on the other hand between the deployable item of equipment and the mobile part 8, in order to protect the satellite 1 and the deployable item of equipment from the high temperatures.

The separation device 6 is then immobilized and secured on the satellite 1, between the body 2 and an item of equipment, making it possible to withstand the stresses expected in particular during transport and the launch phase, during which it must hold the items of equipment in folded position.

The separation device 6 is released at the appropriate time in order to place the items of equipment in the deployed position.

To this end, a control signal is sent to the control system 14. For example, the control device 14 comprises a wireless communication system 18 (SIG), making it possible to receive the control signal sent for example from Earth. In a variant, the control system 14 can be pre-programmed in order to trigger the implementation of the heating device 13 at a given time.

On receiving the control signal, the control system 14 initiates the startup of the heating device 13. The temperature of the stationary part 7 increases and the stationary part 7 deforms, increasing its volume under the effect of heat. The temperature of the mobile part 8 can also increase by heat transfer taking place from the stationary part 7, heated via the layer 11 of bonding agent. The separation device 6 does not use a temperature cycle but only a single temperature increase caused by the heating device 13.

As the deformations of the stationary part 7 do not follow the deformations of the mobile part 8, the layer 11 of bonding agent is then subjected to stresses, and in particular shear stresses, i.e. transverse to the thickness of the layer 11 of bonding agent between the two connecting surfaces 9, 10, which causes the separation of the stationary part 7 and the mobile part 8.

This can be adhesive separation, i.e. the layer 11 of bonding agent remains adhered to a single one of the stationary connecting surface 9 and the mobile connecting surface 10, or can be cohesive, i.e. the layer 11 of the bonding agent splits into at least two parts, one part remaining adhered on the stationary connecting surface 9 and the other part remaining adhered on the mobile connecting surface 10.

The optional preload elements 12 participate in the separation by creating an axial stress, i.e. in the direction of the thickness of the layer 11 of bonding agent, tending to separate the stationary part 7 and the mobile part 8. The preload elements 12 are for example springs, compressed between the stationary part 7 and the mobile connecting surface 10 of the mobile part 8 when the separation device 6 is immobilized, and expanded when the layer 11 of bonding agent has been sufficiently weakened by the stresses caused by the differences in the deformation of the two parts 7, 8 and/or by heat. In a variant, the preload elements 12 can be pins which expand under the effect of the heat of the heating device 13 so as to exert an axial force between the stationary part 7 and the mobile part 8. More precisely, the pins have an expansion coefficient higher than that of the stationary part 7, so that they deform more than the stationary part 7 under the effect of heat in order to exert the axial force.

When the stationary part 7 and the mobile part 8 are in direct contact, via contact surfaces 9',10' as previously seen with the example of the conical connecting surfaces 9, 10, the differences in deformation also cause an axial force to be exerted between the two parts 7, 8 by their contact surfaces 9',10', assisting in their separation from one another.

Once the separation between the stationary part 7 and the mobile part 8 is obtained, the control system 14 stops the power supply to the heating device 13. To this end, a stop signal can be received by the communication system 16, or stopping can be programmed after a determined period of time.

The separation mechanism implemented by the separation device 6 mainly involves the difference in the thermal expansion coefficient. In fact, for example when the heating device 13 is mounted on the stationary part 7, under the effect of the heat generated by the heating device 13, the stationary part 7 deforms, at least on its stationary connecting surface 9, and the deformations of the mobile part 8 do not follow those of the stationary part 7. Moreover, as heat is transferred from the stationary part 7 to the mobile part 8, the temperature within the two parts 7, 8 is not identical, yet further accentuating the differences in deformation.

The layer 11 of bonding agent is then weakened, i.e. the mechanical strength of the layer 11 of bonding agent between the two connecting surfaces 9, 10 deteriorates.

The separation mechanism can also involve other parameters, in particular the state of the connecting surfaces 9, 10, promoting, or not, the adhesion of the layer 11 of the bonding agent, the thickness of the layer 11 of the bonding agent and the nature of the bonding agent.

Therefore a set of parameters must be taken into account in order to determine the breaking strain of the assembly formed by the stationary part 7, the layer 11 of the bonding agent, and the mobile part 8, and the temperature to be applied to the stationary part 7 by the heating device 13 in order to obtain separation.

Thus, by way of example only, the following examples may be mentioned of pairs of materials that have been satisfactory in the separation device 6:
- the Invar-Aluminium material pair, with a difference in thermal expansion coefficient of the order of $20 \cdot 10^{-6}$ °C.$^{-1}$;
- the Titanium-Inox material pair, with a difference in thermal expansion coefficient of the order of $2 \cdot 10^{-6}$ °C.$^{-1}$,
- the Aluminium-CFRP material pair, with a difference in thermal expansion coefficient of the order of $24 \cdot 10^{-6}$ °C.$^{-1}$.

The temperature of heating by the heating device 13 is chosen so as to be less than the decomposition temperature of the bonding agent, i.e. so that the heating temperature does not exceed the temperature beyond which the bonding agent completely loses its mechanical properties and its physical integrity.

For example, the temperature can be chosen to be less than the melting temperature of the bonding agent. Thus, the layer 11 of bonding agent does not melt, avoiding the release of debris that could damage the items of equipment of the satellite 1. Advantageously however, the heating temperature is greater than the glass transition temperature of the bonding agent, so that the layer 11 of bonding agent softens under the effect of heat and is weakened. Preferably, the glass transition temperature is high, i.e. greater than or equal to 50° C.

In a variant, the bonding agent can be thermosetting, so that it does not soften under the effect of heat, but on the contrary hardens, making it more rigid and thus more fragile with respect to the differences in the deformation of the two parts 7, 8. Thus, whilst the two parts 7, 8 deform under the effect of heat, the rigidity of the layer 11 of the bonding agent increases, preventing the bonding layer 11 from following the deformation.

The separation between the stationary part 7 and the mobile part 8 then generates little or no debris or pollution for the items of equipment and the satellite 1.

The bonding agent is for example an adhesive. This is for example an epoxy-based two-component and/or thermosetting structural adhesive. Its shear strength depends on the requirements. Typically, it can be greater than or equal to 20 Mpa (Megapascals) at ambient temperature. Its Young's modulus is also determined as a function of the requirements, and is for example greater than or equal to 1.8 Gpa (Gigapascals) at ambient temperature.

By way of example, when the stationary part 7 is made from aluminium, the mobile part 8 made from Invar, the maximum heating temperature is 200° C., the bonding agent is a Hysol® EA9321 adhesive and the power consumed by the heating device 13 is 300 W, then the time for obtaining the separation between the stationary part 7 and the mobile part 8 is of the order of 2 minutes. The separation time also depends on the electric power used for the heating and the initial temperature of the materials before heating starts. Thus, with a lower electric power (for example 150 W), the separation time can be situated typically between 3 and 10 minutes.

The time for obtaining the release of the separation device 6 is however variable, as it depends in particular on the size of the stationary part 7, the bonding agent and the material used for the stationary 7 and mobile 8 parts. The separation time can thus be adapted depending on the requirements.

In the case of items of equipment in series, i.e. with several articulations, such as the solar panels 5 mounted in series or antenna reflectors or deployable arms or instruments, each separation device 6 placed on each articulation must be released. This is often the case for structures that are large or have significant weight or require a very high resistance to vibrations. According to an embodiment, the release is carried out successively in order to progressively increase the load applied to the remaining devices 6. This makes it possible to limit the electricity consumption. According to a variant, the separation devices 6 are all released simultaneously, so as to obtain the deployed position for the set of panels more rapidly.

The separation is completely controlled by the separation device 6. Thus, in the event of a problem, the heating by the heating device 13 can be stopped, interrupting the separation process. The separation device 6 is equally suitable regardless of the type of orbit, since the exterior environment of the satellite has little or no influence on it, and it is not dependent thereon for its operation.

Moreover, the separation device 6 produces little or no debris that could damage the sensitive items of equipment of the satellite 1. The separation procedure take place gently, without any shock or vibration, in order to protect the items of precision measurement equipment for example.

The separation takes place rapidly, in a few minutes, for example two minutes, but not abruptly as in the state of the art, which makes it possible to stop the separation process if necessary, but also to limit the transfer of heat to the mobile part 8, which is connected to an item of equipment likely to be damaged by too great a temperature increase.

The separation device 6 is thus based on the judicious use of the difference in deformation between the stationary part 7 and the mobile part 8 under the effect of heat. The environment of the satellite has no influence on the separation. The connecting device 6 does not use a thermal cycle, with an increase and decrease in temperature, but only an increase in temperature.

The separation device 6 can moreover by reconditioned. In fact, the deformations of the stationary part 7 and optionally of the mobile part 8 are reversible: once the heating is stopped and the temperature reduces, the parts 7, 8 return to their initial shape. Thus, in order to reuse the separation device 6, it is sufficient to apply a new layer 11 of bonding agent between the connecting surfaces 9, 10. The separation device 6 is thus particularly suitable for tests on the ground.

The separation device 6 can also be used at the interface between a satellite and a launcher, between the different stages of a missile or of a launcher, or on a space probe carrying items of equipment or systems to be separated (vehicle or robot for example) within the context of exploration missions.

The separation device 6 can also be used for constellations of satellites in which the small size of the platforms may require single points of separation of the appendages, which by means of the invention would be easier to quickly develop and reliabilize.

The separation device 6 can also be used on LEO satellites in order to facilitate their disintegration at end of life, by activating the separation of the structural parts of the satellite (assembled beforehand by bonding according to the invention) during the phase of re-entry into the atmosphere.

The invention claimed is:

1. A separation device for controlled separation of a first stationary part and a second mobile part, the stationary part having a thermal expansion coefficient different from that of the mobile part, the separation device comprising:
    at least one bonding agent placed in a layer between a stationary connecting surface of the stationary part and an opposite mobile connecting surface of the mobile part,
    at least one device for heating at least one of the stationary part and the mobile part, and
    at least one control system of the heating device,
    wherein the at least one bonding agent has a decomposition temperature greater than a heating temperature of the heating device.

2. The separation device according to claim 1, in which the heating device is mounted on the stationary part, without contact with the mobile part.

3. The separation device according to claim 1, in which the bonding agent has a glass transition temperature less than a heating temperature of the heating device.

4. The separation device according to claim 1, in which the heating device comprises electric heating elements.

5. The separation device according to claim 1, in which the bonding agent is an adhesive of the Hysol® EA9321 type.

6. The separation device according to claim 1, in which the thermal expansion coefficient of the stationary part is greater than the thermal expansion coefficient of the mobile part.

7. The separation device according to claim 6, in which the stationary part is produced from aluminium or one of its alloys, and the mobile part is produced by selecting one of the following materials: Invar, titanium, silicon carbide, carbon fibre-reinforced polymer (CFRP).

8. The separation device according to claim 7, in which the stationary part is produced from aluminium and the mobile part is produced from Invar, the difference between the thermal expansion coefficient of the stationary part and the thermal expansion coefficient of the mobile part is of the order of $20.10^{-6}$ $C.^{-1}$.

9. The separation device according to claim 1, in which the separation of the stationary part and the mobile part is carried out in a period between 2 and 10 minutes.

10. The separation device according to claim 1, in which the maximum temperature of the heating device is 200° C.

11. The separation device according to claim 1, in which the control system comprises a wireless communication system for receiving a control signal.

12. The separation device according to claim 1, in which the stationary part and the mobile part are cylindrical in shape.

13. The separation device according to claim 1, in which the stationary part and the mobile part are not in direct contact.

14. Use of the separation device (6) according to claim 1 for space launchers, space probes, satellites, missiles.

15. The separation device according to claim 1, wherein the stationary connecting surface of the stationary part is flat and the opposite mobile connecting surface of the mobile part is flat.

16. A separation device for controlled separation of a first stationary part and a second mobile part, the stationary part having a thermal expansion coefficient different from that of the mobile part, the separation device comprising:
at least one bonding agent placed in a layer between a stationary connecting surface of the stationary part and an opposite mobile connecting surface of the mobile part,
at least one device for heating at least one of the stationary part and the mobile part, and
at least one control system of the heating device,
wherein the separation of the stationary part and the mobile part is carried out in a period between 2 and 10 minutes.

17. The separation device according to claim 16, in which the heating device is mounted on the stationary part, without contact with the mobile part.

18. The separation device according to claim 16, in which the bonding agent has a glass transition temperature less than a heating temperature of the heating device.

19. The separation device according to claim 16, in which the heating device comprises electric heating elements.

20. The separation device according to claim 16, in which the bonding agent is an adhesive of the Hysol® EA9321 type.

21. The separation device according to claim 16, in which the thermal expansion coefficient of the stationary part is greater than the thermal expansion coefficient of the mobile part.

22. The separation device according to claim 21, in which the stationary part is produced from aluminium or one of its alloys, and the mobile part is produced by selecting one of the following materials: Invar, titanium, silicon carbide, carbon fibre-reinforced polymer (CFRP).

23. The separation device according to claim 22, in which the stationary part is produced from aluminium and the mobile part is produced from Invar, the difference between the thermal expansion coefficient of the stationary part and the thermal expansion coefficient of the mobile part is of the order of $20.10^{-6}$ $C.^{1}$.

24. The separation device according to claim 16, in which the maximum temperature of the heating device is 200° C.

25. The separation device according to claim 16, in which the control system comprises a wireless communication system for receiving a control signal.

26. The separation device according to claim 16, in which the stationary part and the mobile part are cylindrical in shape.

27. The separation device according to claim 16, in which the stationary part and the mobile part are not in direct contact.

28. Use of the separation device (6) according to claim 16 for space launchers, space probes, satellites, missiles.

29. The separation device according to claim 16, wherein the stationary connecting surface of the stationary part is flat and the opposite mobile connecting surface of the mobile part is flat.

* * * * *